Oct. 20, 1953  N. SWERDLOW ET AL  2,656,201
ADJUSTABLE JOINT STRUCTURE
Filed July 6, 1951
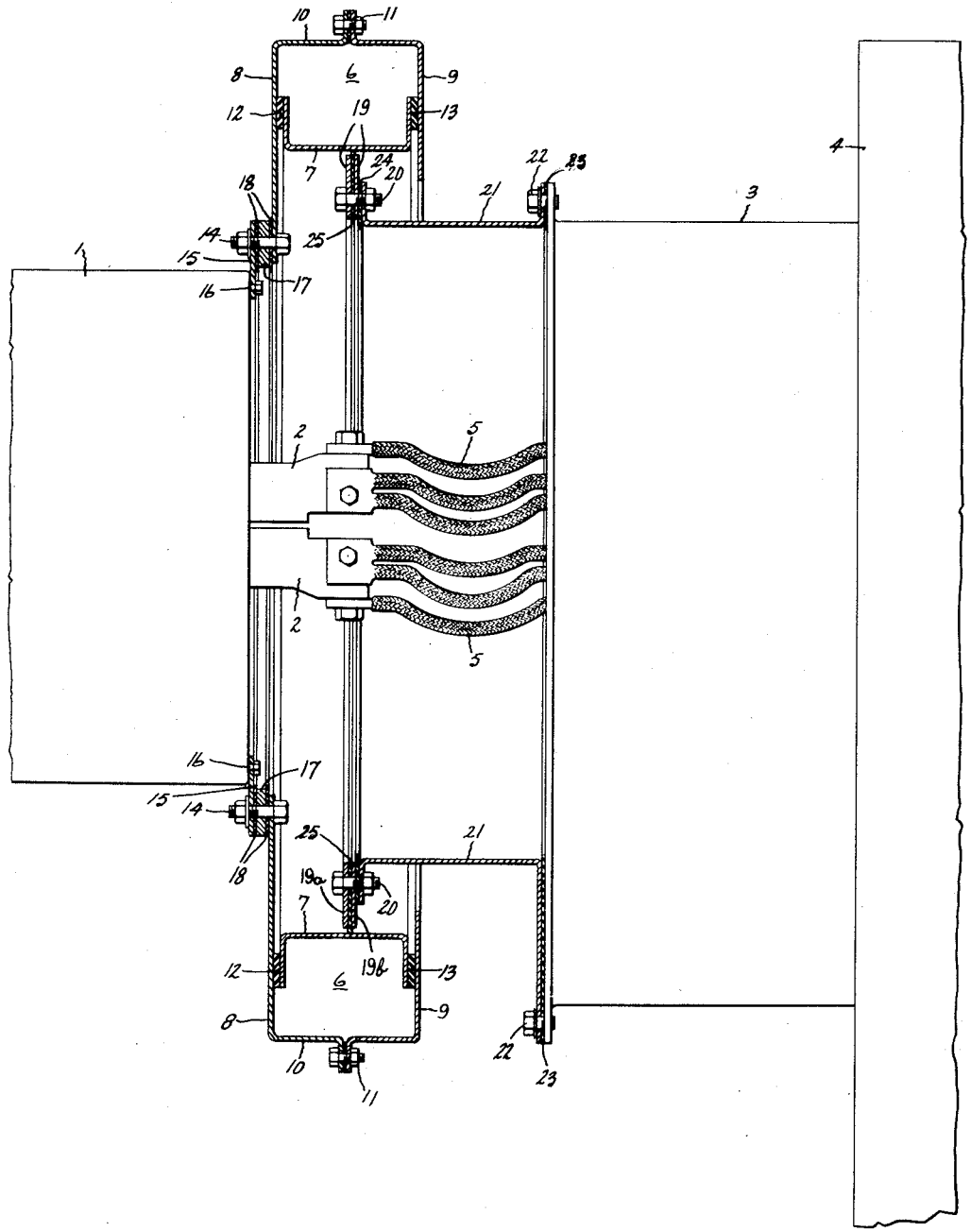
Inventors:
Nathan Swerdlow,
Harry Chamberlain,
by Ernest F. Britton
Their Attorney.

UNITED STATES PATENT OFFICE 2,656,201

ADJUSTABLE JOINT STRUCTURE

Nathan Swerdlow and Harry L. Chamberlain, Philadelphia, Pa., assignors to General Electric Company, a corporation of New York Application July 6, 1951, Serial No. 235,538

2 Claims. (Cl. 285—162)

This invention relates to adjustable joint structure and more particularly to structure for forming a sealed junction between adjacent ends of a pair of tubular members or between one end of a tubular member and another enclosing structure, the joint structure being arranged to accommodate limited movement of one of the tubular members with respect to the other or with respect to an associated enclosing structure in both a transverse and in an axial direction thereby to accommodate initial misalignment during installation or subsequent changes in the relative positions of the parts to be conjoined.

In application Serial No. 47,128 filed August 31, 1948, Swerdlow et al., now Patent No. 2,647,940, assigned to the assignee of this invention, there is disclosed an electric bus construction wherein a number of box-like bus enclosing sheaths having rounded end portions are arranged end to end to form a continuous isolated phase bus run. In such a bus run, the bus conductors are supported on insulators mounted within each box-like sheath structure, electrical contact between the ends of the current-carrying bus sections being established by a flexible joint of known construction. With a bus run of the type disclosed in the above Swerdlow et al. application, it has been found that considerable care must be taken in order properly to align the individual box-like sheaths and to make certain that the overall length of the bus run will be as desired for a particular application. Furthermore, settling of the building in which a bus run is mounted will sometimes tend to establish undesirable mechanical stresses in the bus enclosing sheath.

A principal object of this invention is to provide an improved joint structure for conjoining adjacent enclosing structures such as the box-like sheaths disclosed in the above Swerdlow et al. application which joint structure is arranged to accommodate limited transverse and longitudinal displacement or misalignment of one of the enclosing sheath structures with respect to another adjacent one of such structures.

Another object of this invention is to provide an improved flexible joint structure for conjoining adjacent enclosing structures which facilitates the installation of such enclosing structures and which eliminates mechanical stresses and strains within the enclosing structures due to subsequent shifts in alignment from external causes such as uneven settling of the ground or in the building upon which the structures are mounted.

According to the invention, a continuous peripheral channel-sectioned member which is affixed around or about an opening in one enclosing structure and a projecting flange member which is affixed to another adjacent enclosing structure are arranged to cooperate with a continuous sealing member disposed within the channel member and arranged in sliding relationship with respect to the flange member to form a sealed flexible junction between the two enclosing structures. By this arrangement, limited relative movement between the flange member and the sealing member accommodates relative axial movement between the conjoined members and transverse movement of the sealing member within the channel accommodates limited relative transverse movement of the conjoined structures.

The invention will be better understood from the following description taken in conjunction with the drawing in which the single figure thereof is a view partially in section of an electric bus having an enclosing sheath formed in sections, the junction between adjacent ends of the two tubular enclosing members being formed according to this invention.

In the drawing, the numeral 1 designates a tubular enclosing sheath for a pair of bus conductors 2 which are supported on insulators mounted within the sheath 1. The numeral 3 designates another enclosing structure for the current conductors. The enclosing structure 3 is disposed on electric apparatus 4 which might be a power transformer, for example. A flexible joint between the bus conductors 2 and the transformer terminals is provided in the form of flexible braid conductors 5.

In accordance with this invention, the portion of the enclosing structure for conductors such as 2 and 5 disposed between the right-hand end of the sheath 1 and the left-hand end of the sheath 3 and forming a joint structure is arranged so that limited longitudinal and transverse relative movement between the sheaths 1 and 3 can be accommodated.

It will be understood that the sheath structures 1 and 3 could be circular or rectangular in cross section although for most applications these sheaths would be rectangular in section at the junction structure forming the subject of this invention.

For the purpose of accommodating limited transverse relative displacement of the sheaths 1 and 3, a continuous peripheral channel 6 supported by sheath 1, and having disposed therein a continuous sealing member 7, is provided. The channel member 6 comprises the flange portions 8 and 9 and a web portion 10 constructed of angles joined together by bolts 11. As is shown in the drawing, the sealing member 7 is provided with continuous gaskets 12 and 13 adhering thereto which bear in slidable sealing relationship against the flange portions 8 and 9 respectively of the continuous channel member 6. Preferably the gaskets 12 and 13 are of soft resilient material such as sponge rubber, felt, or the like. While the sealing member 7 is shown in the shape of a channel, it is obvious that the flange portions of this channel could be eliminated and suitable sealing means could be provided along the edges of the web portion thereof so as to eliminate the flanges of the sealing member 7 if desired. By selecting suitable proportions for the parts, a proper degree of compression of the sealing material 12 or 13 or both can be obtained so as to render the joint weather-tight. It will be understood that one surface only of the sealing member 7 need be sealed and that one of the gaskets 12 or 13 could be eliminated if desired. As is shown in the drawing, the flange portion 8 of the channel 6 is secured by means of bolts 14 to a flange 15 affixed in turn to the sheath 1 by bolts 16. Interposed between the flange portion 8 of the channel 6 and the flange 15 is shown a metallic spacer 17 on either side of which is disposed a gasket 18. By this construction, the fixed joint between the flange portion 8 and the sheath 1 is rendered weather-tight. Obviously, the spacer 17, which constitutes a supporting frame-member in the present instance, might be omitted entirely so that it will be appreciated that the flange 8 of the peripheral channel 6 conveniently might be bolted and gasketed directly to enclosure structure 1. From the description thus far, it will be understood that the sealing member 7 is movable in any radial direction within the confines of the channel 6, thereby to accommodate limited transverse relative movement between sheath 1 and sealing member 7.

For the purpose of accommodating limited axial relative movement between the sheaths 1 and 3, the sheath 3 is provided with a projecting peripheral flange member 19 formed of two parts 19a and 19b and mounted by bolts 20 to a tubular intermediate adapter member or body 21 which in turn is secured by bolts 22 to a flange of the sheath 3. As is indicated in the drawing, gasketing material 23 forms a tight joint between the tubular adapter member or body 21 and the transformer terminal casing 3 and gasket 24 forms a tight joint between the flange 19 and the tubular body 21. Thus the tubular member 21 and the flange member 19 together form a flanged member which is telescopically movable axially relative to the sealing member 7. It will be understood that the channel 6, sealing member 7, and the flanged member 21 could all be circular or rectangular in section. The flange member 19 is provided with a centrally disposed sheet rubber wiper member 25 for the purpose of forming a resilient slidable weather-tight seal with the inner surface of the sealing member 7. Thus it will be seen that the sheaths 1 and 3 are relatively adjustable in an axial direction due to the fact that the flange member 19 is telescopically movable within the member 7.

It will be understood that the outwardly projecting flange member 19 could be arranged so as to project inwardly relative to tubular body 21 and the flange portions 8 and 9 of the channel 6 could be arranged so as to project outwardly with the web portion 10 disposed within the opening thus formed by the flange member 19 so that the structure 21 would then partially envelop the channel 6 and the sealing member 7 and the result would be the same as is obtainable by the structure shown in the drawing. Furthermore, it will be understood that the flange 19 could be eliminated if the sealing member 7 were made sufficiently thick in its radial dimension or, if desired, the flange 19 could be secured to the member 7 and arranged to slidably engage the member 21.

While we have shown and described particular embodiments of our invention, we do not wish to be limited thereto and intend in the appended claims to cover all changes and modifications as fall within the true spirit and scope of our invention.

What we claim as new and desire to secure by Letters Patent of the United States is:

1. Adjustable sealing structure for conjoining an axially-extending tubular member with a flanged member constituted by a flange and a generally axially-extending tubular body portion, said sealing structure comprising a continuous channel member having a web portion and a pair of flange portions arranged with one of said flange portions secured about one end of said tubular member, and a continuous sealing member disposed in said channel with the extremities thereof in sealing engagement with the flange portions of said channel, said sealing member being movable within said channel in a transverse direction and being disposed in telescopic sealing relationship with respect to the flange of said flanged member, said flanged member and said sealing member being relatively adjustable in a direction axially of said sealing member, said tubular body portion of the flanged member being transversely spaced from said sealing member throughout the entire axial extent of said tubular body portion.

2. Adjustable sealing structure for conjoining adjacent portions of a pair of enclosing sheath members extending in a generally axial direction, said sealing structure comprising a continuous channel member having a web portion and a pair of inwardly extending flange portions arranged with one of said flange portions secured to one of said enclosing members about an opening therein, a tubular outwardly flanged member secured to the other of said enclosing members and disposed about an opening therein, said flanged member being constituted by a generally axially-extending tubular body portion and a transversely outwardly-extending flange and a continuous sealing member disposed in said channel with the extremities thereof in sealing engagement with the flange portions of said channel, said sealing member extending in a generally axial direction and being adjustable relative to said channel in a transverse direction with respect to the axis of said channel member, and the outwardly extending flange of said flanged member being slidably disposed in sealing relationship within said tubular sealing member, said tubular body portion of the flanged member being transversely spaced from said sealing member throughout the entire axial extent of said tubular body portion.

NATHAN SWERDLOW.
HARRY L. CHAMBERLAIN.

References Cited in the file of this patent
UNITED STATES PATENTS

| Number | Name | Date |
|---|---|---|
| 1,632,042 | Price | June 14, 1927 |
| 1,972,084 | Bogart | Sept. 4, 1934 |